US011212312B2

(12) United States Patent
Wilcox

(10) Patent No.: US 11,212,312 B2
(45) Date of Patent: Dec. 28, 2021

(54) SYSTEMS AND METHODS FOR POLLUTING PHISHING CAMPAIGN RESPONSES

(71) Applicant: MICROSOFT TECHNOLOGY LICENSING, LLC, Redmond, WA (US)

(72) Inventor: Brian Michael Wilcox, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 407 days.

(21) Appl. No.: 16/100,151

(22) Filed: Aug. 9, 2018

(65) Prior Publication Data

US 2020/0053120 A1 Feb. 13, 2020

(51) Int. Cl.
*H04L 29/06* (2006.01)
*G06F 40/205* (2020.01)
(Continued)

(52) U.S. Cl.
CPC .......... *H04L 63/1483* (2013.01); *G06F 21/53* (2013.01); *G06F 40/174* (2020.01);
(Continued)

(58) Field of Classification Search
CPC ............. H04L 63/1483; H04L 63/1416; H04L 63/1491; G06F 40/205; G06F 40/174; G06F 21/53; G06Q 10/107
See application file for complete search history.

(56) References Cited

U.S. PATENT DOCUMENTS 7,558,832 B2 7/2009 Rounthwaite et al.
7,941,842 B2 * 5/2011 Prince ..................... H04M 3/38
726/14
(Continued)

FOREIGN PATENT DOCUMENTS

EP 1382154 A1 1/2004
EP 2611106 A1 7/2013
(Continued)

OTHER PUBLICATIONS

Scherman, et al., "Automatic Malicious Session Detection", Application as Filed in U.S. Appl. No. 15/908,661, filed Feb. 28, 2018, 29 Pages.
(Continued)

*Primary Examiner* — Ghodrat Jamshidi
(74) *Attorney, Agent, or Firm* — Newport IP, LLC; Jacob P. Rohwer

(57) ABSTRACT

Techniques for polluting phishing campaign responses with content that includes fake sensitive information of a type that is being sought in phishing messages. Embodiments disclosed herein identify phishing messages that are designed to fraudulently obtain sensitive information. Rather than simply quarantining these phishing messages from users' accounts to prevent users from providing "real" sensitive information, embodiments disclosed herein analyze these phishing messages to determine what type(s) of information is being sought and then respond to these phishing messages with "fake" sensitive information of these type(s). For example, if a phishing message is seeking sensitive credit card and/or banking account information, some fake information of this type(s) may be generated and sent in response to the phishing message. In various implementations, a natural language processing (NLP) model may (Continued)

be used to analyze the phishing message and/or generate a response thereto.

20 Claims, 6 Drawing Sheets

(51) Int. Cl.
    *G06F 40/174*         (2020.01)
    *G06F 21/53*          (2013.01)
    *G06Q 10/10*         (2012.01)

(52) U.S. Cl.
    CPC ......... *G06F 40/205* (2020.01); *G06Q 10/107* (2013.01); *H04L 63/1416* (2013.01); *H04L 63/1491* (2013.01)

(56) References Cited

U.S. PATENT DOCUMENTS

| | | | |
|---|---|---|---|
| 8,181,250 | B2 | 5/2012 | Rafalovich et al. |
| 9,076,132 | B2* | 7/2015 | Golan ................. H04L 63/1491 |
| 9,311,476 | B2 | 4/2016 | Stolfo et al. |
| 9,560,075 | B2 | 1/2017 | Goldberg et al. |
| 9,813,450 | B1 | 11/2017 | Wasiq et al. |
| 9,887,992 | B1* | 2/2018 | Venkat ..................... G06F 21/35 |
| 10,298,598 | B1* | 5/2019 | McClintock .......... H04L 63/145 |
| 10,601,868 | B2 | 3/2020 | Wilcox |
| 10,686,836 | B1* | 6/2020 | Stolfo ................. G06F 21/6245 |
| 10,855,722 | B1* | 12/2020 | Vadlamani .......... H04L 63/1491 |
| 2004/0215977 | A1 | 10/2004 | Goodman et al. |
| 2005/0198563 | A1* | 9/2005 | Kristjansson ......... G06F 40/174 |
| | | | 715/224 |
| 2007/0192853 | A1 | 8/2007 | Shraim et al. |
| 2008/0162338 | A1* | 7/2008 | Samuels .............. G06Q 40/025 |
| | | | 705/38 |
| 2009/0228780 | A1* | 9/2009 | McGeehan ......... H04L 63/1441 |
| | | | 715/234 |
| 2009/0241191 | A1* | 9/2009 | Keromytis .............. H04L 51/22 |
| | | | 726/23 |
| 2012/0324113 | A1* | 12/2012 | Prince ..................... H04L 69/40 |
| | | | 709/226 |
| 2013/0262242 | A1 | 10/2013 | Tateo et al. |
| 2014/0041024 | A1 | 2/2014 | Larkins |
| 2014/0282872 | A1 | 9/2014 | Hansen et al. |
| 2015/0277681 | A1 | 10/2015 | Isaacson et al. |
| 2016/0005050 | A1 | 1/2016 | Teman |
| 2016/0241579 | A1* | 8/2016 | Roosenraad ........ H04L 63/1425 |
| 2017/0134423 | A1 | 5/2017 | Sysman et al. |
| 2017/0237753 | A1* | 8/2017 | Manning Dawson ....................... H04L 63/1416 |
| | | | 726/23 |
| 2017/0310705 | A1 | 10/2017 | Gopalakrishna et al. |
| 2017/0331858 | A1 | 11/2017 | Clark et al. |
| 2018/0007066 | A1* | 1/2018 | Goutal ................ H04L 63/1483 |
| 2020/0053121 | A1 | 2/2020 | Wilcox |

FOREIGN PATENT DOCUMENTS

| | | |
|---|---|---|
| EP | 2942919 A1 | 11/2015 |
| KR | 20050073702 A | 7/2005 |
| WO | 2006131124 A1 | 12/2006 |
| WO | 2017145001 A1 | 8/2017 |

OTHER PUBLICATIONS

"International Search Report and Written Opinion Issued in PCT Application No. PCT/US19/038824", dated Sep. 24, 2019, 10 Pages.

"International Search Report and Written Opinion Issued in PCT Application No. PCT/US19/038830", dated Sep. 20, 2019, 11 Pages.

"BOTsink: Network-based Threat Deception for Post-Compromise Threat Detection", Retrieved from: https://attivonetworks.com/product/attivo-botsink/, Retrieved on: Jun. 18, 2018, 19 Pages.

"Office 365 helps secure Microsoft from modern phishing campaigns", In Technical White Paper of Microsoft, Apr. 10, 2018, 15 Pages.

Costarella, et al., "Hardening Honeynets against Honeypot-Aware Botnet Attacks", In Proceedings of International Conference on Information Security and Cryptology, Dec. 14, 2008, pp. 1-35.

Li, et al., "A novel anti-phishing framework based on honeypots", In Proceedings of eCrime Researchers Summit, Sep. 20, 2009, 19 Pages.

Long, D.J., "Deception and Sandboxing", Retrieved from: https://securingtomorrow.mcafee.com/business/deception-and-sandboxing/, Oct. 20, 2016, 4 Pages.

"Notice of Allowance Issued in U.S. Appl. No. 16/100,154", dated Nov. 13, 2019, 09 Pages.

* cited by examiner

SYSTEMS AND METHODS FOR POLLUTING PHISHING CAMPAIGN RESPONSES

BACKGROUND

Protecting unsuspecting users from phishing communications is becoming increasingly important as the prevalence of such communications continues to surge. For example, a "phisher" may develop a phishing campaign that includes emails that are designed to fraudulently obtain sensitive information. Oftentimes these emails appear to originate from a reputable organization and indicate that a user's financial or email account has been compromised. These emails may also include a link that is selectable to direct an unsuspecting user to a phishing website where the user is requested to provide sensitive information such as an account number, a password, a social security number, and so on. The phishing campaign may be implemented by sending these emails out to hundreds, thousands, or even millions of users—for which email addresses are sold in online marketplaces. Despite significant efforts by modern email service providers to filter these phishing emails out of users' inboxes, some of these emails do make it through and deceive unsuspecting users into providing sensitive information.

Unfortunately, implementing such phishing campaigns is of little cost to a phisher in terms of both time and money. For example, once a phisher obtains a list of users' email addresses, the phisher can easily develop new phishing emails and repeatedly target the same users. Even though only a fraction of such emails will successfully elicit a response, these responses typically include valuable information such as, for example, usernames, passwords, and/or financial information that the phisher may then exploit. In many instances, this exploitation includes phishers using this information to compromise the security of victims' computing resources. Then, these victims' and/or their employers typically must expend significant computing resources, human resource, and financial resources to mitigate the phishing campaigns by regaining security of compromised devices.

It is with respect to these and other considerations that the disclosure made herein is presented.

SUMMARY

Technologies described herein facilitate polluting phishing campaign responses by generating and transmitting content that is responsive to phishing messages (e.g., emails). Generally described, embodiments disclosed herein identify electronic messages that are designed to fraudulently obtain sensitive information (e.g., phishing messages). Rather than merely quarantining these phishing messages from users' accounts to prevent users from providing "real" sensitive information, embodiments disclosed herein analyze these phishing messages to determine what type(s) of information is being sought. Then, responses that include "fake" sensitive information of the type(s) being sought by the phisher are generated and sent to pollute whatever pool of responses is received by the phisher.

Exemplary "fake" sensitive information may include dummy credit card numbers and/or dummy account credentials. Additionally, or alternatively, "fake" sensitive information may include credentials (e.g., user names and/or passwords) for logging into fake user accounts. This lures phishers into accessing the fake user accounts so that information about the phisher can be collected. It should be appreciated that by polluting the responses that are received in association with a phishing campaign, the technologies described herein provide a significant barrier to successfully exploiting any fraudulently obtained "real" sensitive information. For example, even if a phisher does successfully obtain some real sensitive information, such information will be buried within "fake" sensitive information that is also obtained.

Implementations of the techniques described herein mitigate security risks posed by malicious phishing emails scams and, in turn, significantly reduce the computing resources and human resources that are required to regain security of compromised user devices and/or user accounts. As a specific but nonlimiting example, once a phisher gains access to a specific real user account, it is common for the phisher to immediately change the user credentials associated with this specific real user account to essentially lock-out the real and rightful owner of the account. Then, significant computing resources are typically allotted to sophisticated security systems in order to regain control over the real user account. It can be appreciated that in any server computing environment (which are made up of interconnected discrete hardware devices having inherently limited computational capacity), any allotment of resources towards regaining control over compromised user accounts prevents those allotted resources from being allotted toward other functions such as an enterprises core business objective.

Implementations of the techniques described herein relate generally to isolating malicious code (e.g., malicious user interface (UI) controls) from reaching individual real user accounts and individual real user devices for the specific technical purpose of preventing vulnerable computing resources (e.g., user accounts and user devices) from being compromised. In many cases phishing emails contain viruses (e.g., ransomware). Therefore, it will be appreciated that by quarantining suspicious and/or flagged messages within an isolated computing environment and then activating UI controls and/or otherwise responding to the flagged messages, the described techniques are specifically directed towards performing isolation and eradication of computer viruses, worms, and other malicious code from vulnerable computing resources (e.g., user accounts, user devices, etc.).

In some implementations, a system receives a message that is addressed to a user account. For example, the message may be addressed to a user's legitimate email account that is included in a list of email accounts purchased or otherwise obtained by a phisher. The message may include various user interface (UI) input controls that are designed to fraudulently persuade the user into providing sensitive information. An exemplary such UI input control may be a hyperlink that causes a web browser to launch a webpage that is designed to mimic a look-and-feel of a reputable organization such as an email service provider or a financial organization. The linked webpage may prompt the user to enter sensitive information into one or more data entry fields.

Upon receiving the message, the system may analyze the message with respect to filter criteria to determine whether the message should be designated as a phishing message. For example, the filter criteria may indicate that any message that includes a link to a website that is not hosted by a specific "whitelist" of trusted domains is to be designated as a phishing message. Additionally, or alternatively, the message may be manually designated as a phishing message by a user that is being targeted by the message. For example, the message may pass through a security filter and reach the user's email inbox and, therefore, be viewable via a user device. However, the user may recognize the nature of the message and manually designate (e.g., "flag") the message as being a phishing message.

Based on the message being designated as a phishing message, the system may activate one or more UI input controls that are included within the message to generate content that is responsive to the message. In some implementations, this includes activating ("detonating") a hyperlink that is included in the message. Then, upon being directed to a malicious webpage that is designed to fraudulently obtain sensitive information, the system may determine one or more types of information that are being sought via the message and generate "fake" sensitive information of this type(s). For example, the system may parse through the website text and recognize that users are being asked to enter credit card numbers and/or account credentials (e.g., user names and/or password) into various form fields. The system may respond by generating a fake credit card number and/or fake account credentials and entering this fake information into the various form fields.

Then, the system may cause a response to be transmitted where the response includes the generated content that is responsive to the message. However, rather than including "real" sensitive information, this generated content includes "fake" sensitive information. After having entered the fake sensitive information into the various form fields, the system may activate a UI input control that causes whatever information has been entered into the form fields to be submitted to a phisher computer system—which may simply be a third-party cloud computing service that the phisher is utilizing to implement the phishing campaign.

In some implementations, the system may determine that the message is seeking credentials to user accounts such as, for example, email accounts and/or file hosting accounts. Then, the system may respond to such phishing messages with fake user credentials that are usable to log into a fake user account. For example, if the phishing email is addressed to a particular user account (e.g., steve@enterprisedomain.com) and requests that the user provide both their current password and a new updated password, the system may cause a response to be transmitted that includes a "fake" current password and/or a "fake" updated password. These fake user credentials may be usable to log into the fake user account.

The fake user account may be populated with documents that have been specifically generated for the fake user account in order to cause this fake user account to appear to the phisher as being the actual user account to which the phishing message was originally addressed. For example, under circumstances where the message is addressed to the particular user account that has corresponding real login credentials (e.g., a real password), then visiting a specific login webpage and entering the real login credentials in association with the particular user account may provide access to the real user account. In some implementations, when this same specific login webpage is used to enter the fake user credentials in association with the particular user account, the system may provision access to the fake user account in lieu of the real user account.

In some implementations, the system may use a natural language processing (NLP) model to analyze a body of text that is included within the phishing message to determine what type of information is being sought. For example, the phishing message may include some fanciful fact pattern that alleges that the user will be compensated for assisting with some task (e.g., a "Nigerian 419" scam that indicates that a user will be compensated for their assistance in transferring a sum of money). Continuing with this example, the system may analyze the body of the message to identify that the phishing message is soliciting the targeted users to respond with bank account information (e.g., that will purportedly be used to transfer the large sum of money).

Then, the system may further leverage various artificial intelligence (AI) techniques such as, for example, the NLP model to generate a response to the phishing message. The response may include fake sensitive information of the type being sought (e.g., the response may include fake banking account details). The response may further request additional information or otherwise be designed to trigger a conversation cycle in which the phisher is lured into conversing with the system. In this way, the phisher is duped into wasting some amount of time participating in the conversation cycle—thereby preventing them from utilizing that time to target and/or converse with real users that may potentially fall victim to the phishing campaign.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description describes techniques for polluting phishing campaign responses with content that includes fake sensitive information of a type that is being sought in phishing messages. More specifically, responses to the phishing messages that contain the content are sent to pollute phishing campaign responses in the sense that at least some portion of the phishing campaign responses received in association with the phishing messages contain the fake sensitive information.

Generally described, embodiments disclosed herein identify phishing messages that are designed to fraudulently obtain sensitive information. Rather than simply quarantining these phishing messages from users' accounts to prevent users from providing "real" sensitive information, embodiments disclosed herein analyze these phishing messages to determine what type(s) of information is being sought and then respond to these phishing messages with "fake" sensitive information of these type(s). It should be appreciated that by polluting the responses that are received in association with a phishing campaign, the technologies described herein provide a significant barrier to successfully exploiting any fraudulently obtained "real" sensitive information.

Implementations of the techniques described herein relate generally to isolating malicious code (e.g., malicious user interface (UI) controls) from reaching individual real user accounts and individual real user devices for the specific technical purpose of preventing vulnerable computing resources (e.g., user accounts and user devices) from being compromised. In many cases phishing emails contain viruses (e.g., ransomware). Therefore, it will be appreciated that by quarantining suspicious and/or flagged messages within an isolated computing environment and then activating UI controls and/or otherwise responding to the flagged messages, the described techniques are specifically directed towards performing isolation and eradication of computer viruses, worms, and other malicious code from vulnerable computing resources (e.g., user accounts, user devices, etc.).

Figure 1:
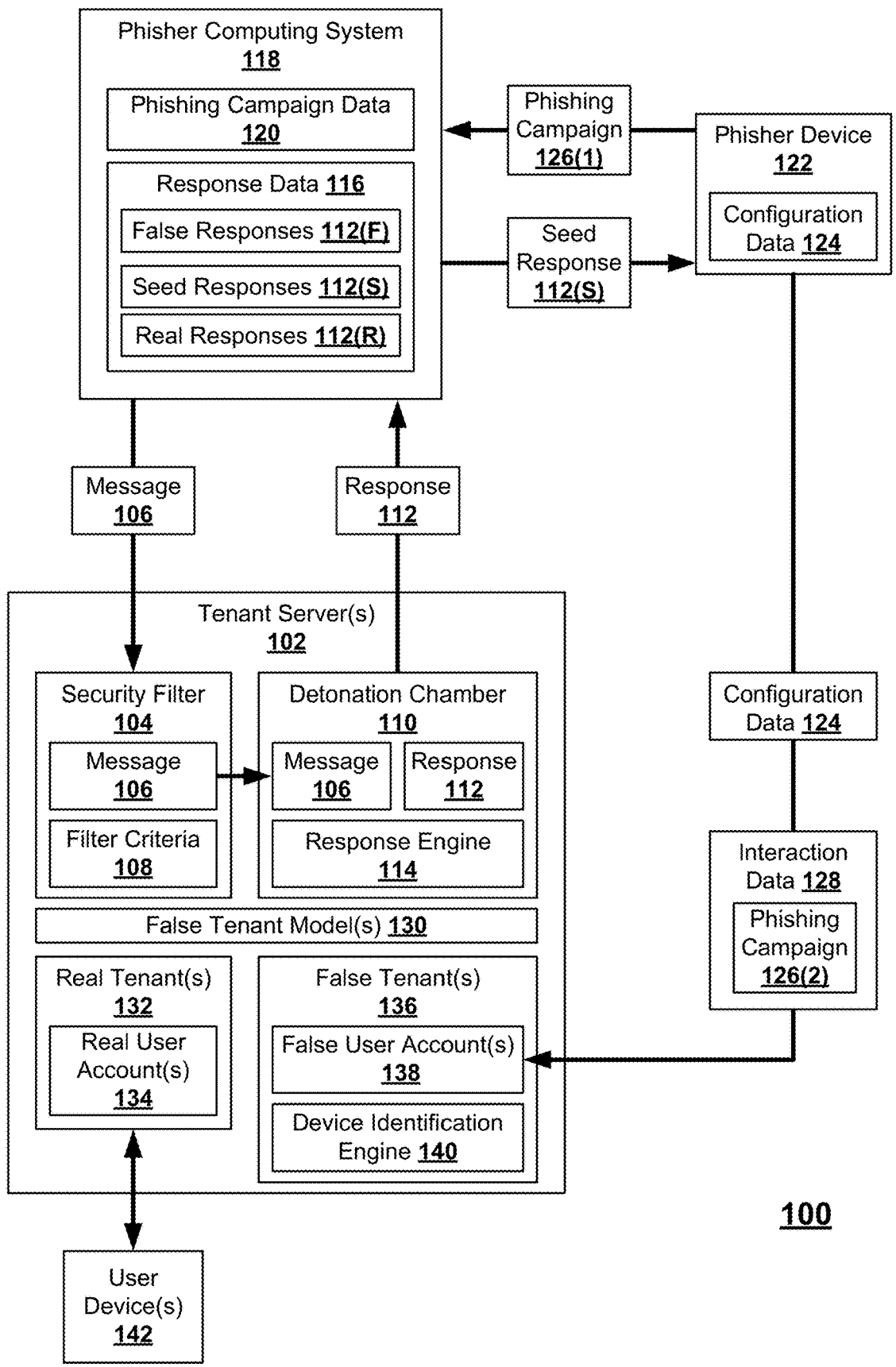
FIG. 1 illustrates a system for identifying messages that are designed to fraudulently obtain sensitive information (e.g., phishing messages) and generating fake sensitive information to pollute response data that is associated with a phishing campaign.

Turning now to FIG. 1, illustrated is a system 100 for identifying messages 106 that are designed to fraudulently obtain sensitive information (e.g., phishing messages) and then generating fake sensitive information to pollute response data 116 that is associated with a phishing campaign 126. Exemplary fake sensitive information may include, but is not limited to, dummy banking information (i.e., information that appears to be but is not actually associated with a valid bank account) and/or dummy email account credentials (i.e., information that appears to be but is not actually associated with a valid email account). In this way, even if a phisher (e.g., a person or entity that is implementing a phishing campaign 126) does obtain some real sensitive information (e.g., real bank account information and/or real email account information) from users that are unsuspectingly duped by the messages 106, the phisher will have difficulty in confidently identifying and exploiting this real sensitive information since it will be essentially buried within the fake sensitive information. Thus, among other benefits, the technologies described herein provide a significant barrier to successfully exploiting any fraudulently obtained real sensitive information.

As illustrated, the system 100 may include one or more tenant servers 102 that are designed to implement one or more real tenants 132. Individual ones of these real tenants 132 may correspond to individual enterprises (e.g., businesses, government organizations, education organizations, etc.) and may include one or more real user accounts 134. For example, a particular business may purchase a subscription to a real tenant 132 (e.g., an OFFICE 365 tenant offered by MICROSOFT, a G SUITE tenant offered by GOOGLE, etc.) and a tenant administrator within the particular business may initiate (set-up) and manage the real user accounts 134 for individual employees of the particular business.

Individual users (e.g., employees) may be assigned real user credentials that enable the individual users to access their real user accounts 134 via one or more user devices 142. As a specific but nonlimiting example, the real user credentials may include an email alias (e.g., steve@enterprisedomain.com) and a real user password. The individual users may log into their real user account 134 by entering these credentials via a specific webpage that is associated with the tenant servers 102. Upon successfully logging into their corresponding real user account 134, the users may be provided with access to a variety of resources such as, for example, an email account (e.g., a GMAIL and/or OUTLOOK account) and/or a file hosting account (e.g., GOOGLE DRIVE and/or OUTLOOK).

The tenant servers 102 may implement a security filter 104 to analyze messages and to filter out phishing messages that are designed to fraudulently persuade ("dupe") the users into providing various types of sensitive information. For example, as illustrated, a message 106 is transmitted from a phisher computer system 118 to the tenant servers 102 where it is received by the security filter 104. The message 106 may correspond to a first phishing campaign 126(1) that a phishing entity generates on a phisher device 122 and uploads to the phisher computing system 118 for implementation. The phisher computing system 118 may include one or more server computers that are leveraged to implement one or more phishing campaigns 126.

Upon receipt of the message 106, the tenant servers 102 may deploy the security filter 104 to analyze the message 106 with respect to the filter criteria 108. The filter criteria 108 may include, for example, a blacklist of known malicious phishing websites so that any message that contains a link to a blacklisted website will be designated as a phishing message, a white list of known trusted websites so that any message that contains a link to a non-whitelisted website will be designated as a phishing message, or other criteria that is indicative of a particular message being designed for phishing purposes. Based on the analysis of individual messages 106 with respect to the filter criteria 108, the security filter 104 may determine which messages are allowed to pass through to the real user account(s) 134 for access by the users via the user device(s) 142. In the illustrated example, the message 106 that is transmitted from the phisher computing system 118 is analyzed by the security filter 104 with respect to the filter criteria 108 and, ultimately, is designated by the security filter 104 as a phishing message.

In order to safely handle fishing messages, the tenant servers 102 may implement a detonation chamber 110 that is designed to facilitate manipulation of various aspects of individual messages 106 in a protected environment. For example, the detonation chamber 110 may be an isolated computing environment such as, for example, a container and/or light weight virtual machine that isolates the real tenants 132 and real user accounts 134 thereof from any computing activity that occurs within the detonation chamber 110. In the illustrated example, the message 106 is designated by the security filter 104 as a phishing message and, as a result, is transmitted into the detonation chamber 110. The detonation chamber 110 isolates the message 106 and any malicious contents thereof from other components of the tenant servers 102.

In some implementations, links that are contained within the message 106 that the security filter 104 transmits into the detonation chamber 110 may be detonated (e.g., activated and/or selected) within the detonation chamber 110 to safely observe and/or analyze the resulting effects. As a specific but nonlimiting example, the message 106 may contain a link that directs a web browsing application to a phishing website that is designed to fraudulently obtain sensitive information from unsuspecting users. In many instances such phishing websites are specifically designed to aesthetically mimic a website of a legitimate organization and may even be hosted at a website address that closely resembles that of the legitimate organization's website. For example, the message 106 may indicate that the user's bank account has experienced a security breach and that the specific user action of visiting a linked website for the purpose of resetting a password is required to prevent the bank account from being frozen.

Upon activating the link(s) that is contained within the message 106, a web browser may open the linked website which may include various form fields that the users instructed to enter specific types of sensitive information into. For example, users may be prompted to enter a username and password associated with an online banking account.

The tenant servers 102 may further utilize a response engine 114 to generate a response 112 to the message 106 in order to pollute response data 116 on the phisher computing system 118. The response engine 114 may analyze the message 106 to identify one or more types of sensitive information that the message 106 is designed to fraudulently obtain from unsuspecting users. For example, continuing with the example in which the message 106 indicates that the user's bank account has been compromised and contains a link to a website that prompts users to enter their associated username and/or password, the response engine 114 may analyze the linked website to identify that users are being prompted to enter a username into a first form field and a password into a second form field.

Upon identifying the type(s) of information being sought, the response engine 114 may generate content that includes fake sensitive information of those type(s). For example, the response engine 114 may generate fake usernames and/or fake passwords. Ultimately, response engine 114 may cause a response 112 that contains generated content to be transmitted to the phisher computing system 118.

In some implementations, the response engine 114 may generate false responses 112(F) which include false sensitive information that is completely unusable. For example, a false response 112(F) may include one or both of a false username and/or false password that are generated by the response engine 114 and are unusable in the sense that the false username and/or false password do not provide access to any real user account 134 or any false user account 138 as described below. As another example, a false response 112(F) may include false credit card number that is unusable in the sense that it does not actually correspond to any credit card account.

In some implementations, the response engine 114 may be configured to generate false sensitive information that on its face passes one or more authenticity criteria. As a specific but nonlimiting example, under circumstances in which the response engine 114 determines that the message 106 is fraudulently seeking credit card numbers, the response engine may generate and transmit false credit card numbers which satisfy the Luhn algorithm that is commonly used to verify the authenticity of credit card numbers. In this way, it will be impractical for the phisher to sift through the responses and separate the fake sensitive information from any real sensitive information that is also obtained.

As used herein, when used in the context of an adjective modifying a noun, the term "false" generally refers to the denoted item (e.g., user account, response, credit card number, user credential, etc.) appearing to be a genuine instance of the denoted item that is deliberately made to deceive an entity. For example, a user account that is created and populated with items (e.g., emails, data files, etc.) that are generated by a machine learning model (e.g., a false tenant model) rather than by a human user for the purpose of deceiving a phishing entity, may aptly be referred to herein as a false user account. As another example, a response that is generated by a response engine as described herein and then transmitted to a phishing entity to dilute and/or pollute response data may aptly be described as a false response. As used herein, when used in the context of an adjective modifying a noun, the term "real" generally refers to the denoted item being a genuine instance of the denoted item. For example, a user account that is actually assigned to and utilized by a human employee of an organization may aptly be described as a real user account.

By generating and transmitting false responses 112(F) that are responsive to the message 106 but that merely include false sensitive information of the type being sought within the message 106, the system 100 may create substantial barriers to phishers being able to exploit even real responses 112(R) (i.e., responses that are generated by real users and that contain real sensitive information)—if any exist within the response data 116. For example, consider a scenario in which implementation of the phishing campaign 126(1) results in one million emails being sent out to different user aliases. Suppose that of the one million emails that are sent, some fraction of these emails successfully reaches users' inboxes (e.g., passes through the security filter 104) and dupes these users into providing real sensitive information. Typically, a phisher that receives these responses would have a very high degree of confidence that the information provided is actual real sensitive information that is readily exploitable (e.g., for financial gain and/or other purposes).

By transmitting some amount of false responses 112(F), the techniques described herein serve to pollute the response data 112 by diluting any real responses 112(F) with some amount of false responses 112(F). For example, suppose that the response data 116 includes a mere fifteen real responses 112(R). Typically, even though the phishing campaign 126(1) may have a relatively low success rate (e.g., 15 parts per million) the resulting successes are readily identifiable and exploitable to any malicious entity having access to the response data 116. However, if the response data 116 further includes some amount of false responses 112(F), then the resulting successes will be hidden or buried within the noise generated by the false responses 112(F). This makes identification and exploitation of the real sensitive data difficult and in some cases impractical. Building off the specific but nonlimiting example from above, if in addition to the fifteen real responses 112(R) the response data 116 also includes fifteen-hundred false responses 112(F), then a phisher will be forced to spend a substantial amount of time and resources sifting through the false responses 112(F). Furthermore, the phisher will have no effective means to readily identify whether any particular piece of sensitive information is real or fake.

In some implementations, the response engine 114 may generate seed responses 112(S) which include information that appears to be of the type being sought within the message 106 but which actually leads to one or more false user accounts 138. As a specific but nonlimiting example, under circumstances in which the message 106 seeks to obtain credentials that are usable to access a real user account 134, the response engine 114 may generate a seed response 112(S) that includes one or more credentials that are usable to access a false user account 138 that is being hosted by a false tenant 136. As illustrated, the phisher device 122 may be used to obtain the seed response 112(S) from the response data 116. Then, the phisher device 122 may be used to access the false user account 138 by providing the user credentials obtained from the seed response 112(S) to the tenant servers 102.

As described in more detail below, the false user account 138 may even be populated with false data files to give the appearance of being a real user account 134. For example, the tenant server 102 may implement one or more false tenant models 130 to generate false data files (e.g., data files that contain made-up or fanciful data but that resemble legitimate business files such as user emails and hosted documents). Thus, a malicious actor that logs onto the false user account 138 may be enticed to spend time browsing through the false data files.

In some implementations, the response engine 114 may be designed to cause transmission of false responses 112(F) and/or seed responses 112(S) at a rate that is sufficiently high to disrupt operation of the phisher computing system 118. For example, the response engine 114 may conduct a Denial of Service (DoS) attack and/or a Distributed Denial of Service (DDoS) attack by repeatedly activating the link within the message 106 and/or repeatedly transmitting responses 112 to the phisher computing system 118. In this way, the techniques described herein may be usable to both pollute the response data 116 with false responses 112(F) and/or seed responses 112(S) and also to prevent unsuspecting users from even being able to provide real sensitive information. For example, even if a phishing message associated with the phishing campaign 126(1) actually makes it through to a particular user's inbox and this particular user actually clicks the link with the intention of providing the requested information (e.g., the real sensitive information), the web server(s) that is hosting phishing website will be experiencing so many requests and/or responses from the response engine 114 that it will be unable to serve the particular user's request.

The tenant server(s) 102 may include a device identification engine 140 to determine configuration data 124 that corresponds to the phisher device 122 when that phisher device 122 is used to log into the false user account 138. Exemplary configuration data 124 may include, but is not limited to, a screen size of the phisher device 122, a resolution of the phisher device 122, browser configurations on the phisher device 122, one or more plug-ins that are being operated by the phisher device 122, what browser is being used on the phisher device 122, an Internet protocol (IP) address associated with the phisher device 122, and/or any other information that is discernible about the phisher device 122. This configuration data 124 may provide the device identification engine 140 with the ability to identify one or more other login attempts that originate from the phisher device 122.

Stated plainly, the configuration data 124 serves as a "fingerprint" for the phisher device 122. For example, due to the extremely high number of possible combinations of browser settings and plug-ins that can exist on any particular personal computing device (e.g., a laptop computer, etc.), it may be exceedingly improbable that more than one computing device at any particular IP address will have a specific combination of browser settings and plug-ins. This may hold true even if the particular IP address supports a substantially large number of computing devices such as, for example, in the case of IP addresses that are assigned to universities and other large organizations.

Since the false user account 138 is not actually assigned to any human user for legitimate purposes, it can be assumed with a high degree of confidence that the phisher device 122 that has logged into the false user account 138 is being used by a malicious entity for illegitimate and malicious purposes. Accordingly, the system 100 may utilize the configuration data 124 to "fingerprint" the phisher device 122 and identify when it is subsequently used to attempt to log into one or more real user accounts 134. In some implementations, the tenant servers 102 may deny such attempts to log into real user accounts 134 from devices that are identified as having previously been used to log into one or more false user accounts 138—even if the user credentials provided from the phisher device 122 are completely accurate. In this way, even if a particular user is duped by a phishing email and provides the phisher with their real user credentials, the phisher will still be denied access to the particular user's real user account 134—so long as the phisher attempts to access the account from a "fingerprinted" computing device.

Additionally, or alternatively, the tenant servers 102 may initiate enhanced security protocols in association with a real user account 134 in response to determining that the "fingerprinted" phisher device 122 is currently being used in an attempt to log into the real user account 134. For example, suppose that information has been provided in association with the real user account 134 that is sufficient to require multi-factor authentication for logging in. For example, the user for the account has provided both a password and also a cell phone number via which receive text message codes that are to be provided as an additional factor (i.e., in addition to the password) in order to log into the particular user account 134. Under these specific but nonlimiting circumstances, an attempt to log into the user account 134 from a device that resembles the phisher device 122 (e.g., has configuration data 124 that matches that of the phisher device 122 to a certain degree) may trigger heightened security requirements of multifactor authentication.

Additionally, or alternatively, the tenant servers 102 may initiate enhanced security protocols for one or more real user accounts 134 in response to determining that the "fingerprinted" phisher device 122 has at some previous time been used to log into the real user accounts 134. For example, suppose that the phisher device 122 has already been used to log into a real user account 134 and then is subsequently used to log into the false user account 138—for which the credentials are provided in the seed response 112(S). Under these circumstances, one or more tenant administrators for the real tenants 132 may be notified that the real user account 134 has ostensibly been compromised and/or a password reset procedure may be required in association with the particular real user account 134.

In some implementations, one or more components of the system 100 may monitor interactions that occur between the phisher device 122 and the false user account 138 to gather additional phishing campaign data 120. As illustrated, for example, interaction data 128 that is being transmitted from the phishing device 122 to the false user account 138 is shown to include information associated with a second phishing campaign 126(2). As a specific but nonlimiting example, under the belief that the false user account 138 is actually a real user account 134, a malicious entity (e.g., phisher) may attempt to send out additional phishing messages to one or more false user contacts that are stored in association with the false user account 138.

As described in more detail below, a false tenant model 130 may be used to generate fake documents, fake emails, and/or fake contacts (e.g., fake email aliases). This generated content can be used to populate the false user account 138 thereby making it appear to be a real user account (i.e. a user account that is actively utilized by a real user for business purposes). Then, the malicious entity (e.g., phisher) may attempt to transmit emails to these fake contacts that are designed based on the second phishing campaign 126(2). In some implementations, the false user account 138 may be configured with an inbox for received messages and an outbox for sent messages.

As described in more detail below, the false tenant model 130 may be used to continually populate the inbox and/or outbox with received and/or sent mail over the course of time. In this way, as the phisher is logged into the false user account 138, the realistic appearance is that some real user is also simultaneously logged in and is currently using the account to send and/or receive emails—although it can be appreciated that no such real user actually exists. Email messages that are "sent" by the phisher from the false user account 138 may in some embodiments show up in the outbox. Furthermore, in some implementations, emails that are "sent" by the phisher may be transmitted to the response engine 114 to trigger additional false responses 112(F) and/or seed responses 112(S) to be sent to the phisher computing system 118 and/or to the inbox of the false user account 138.

Figure 2:
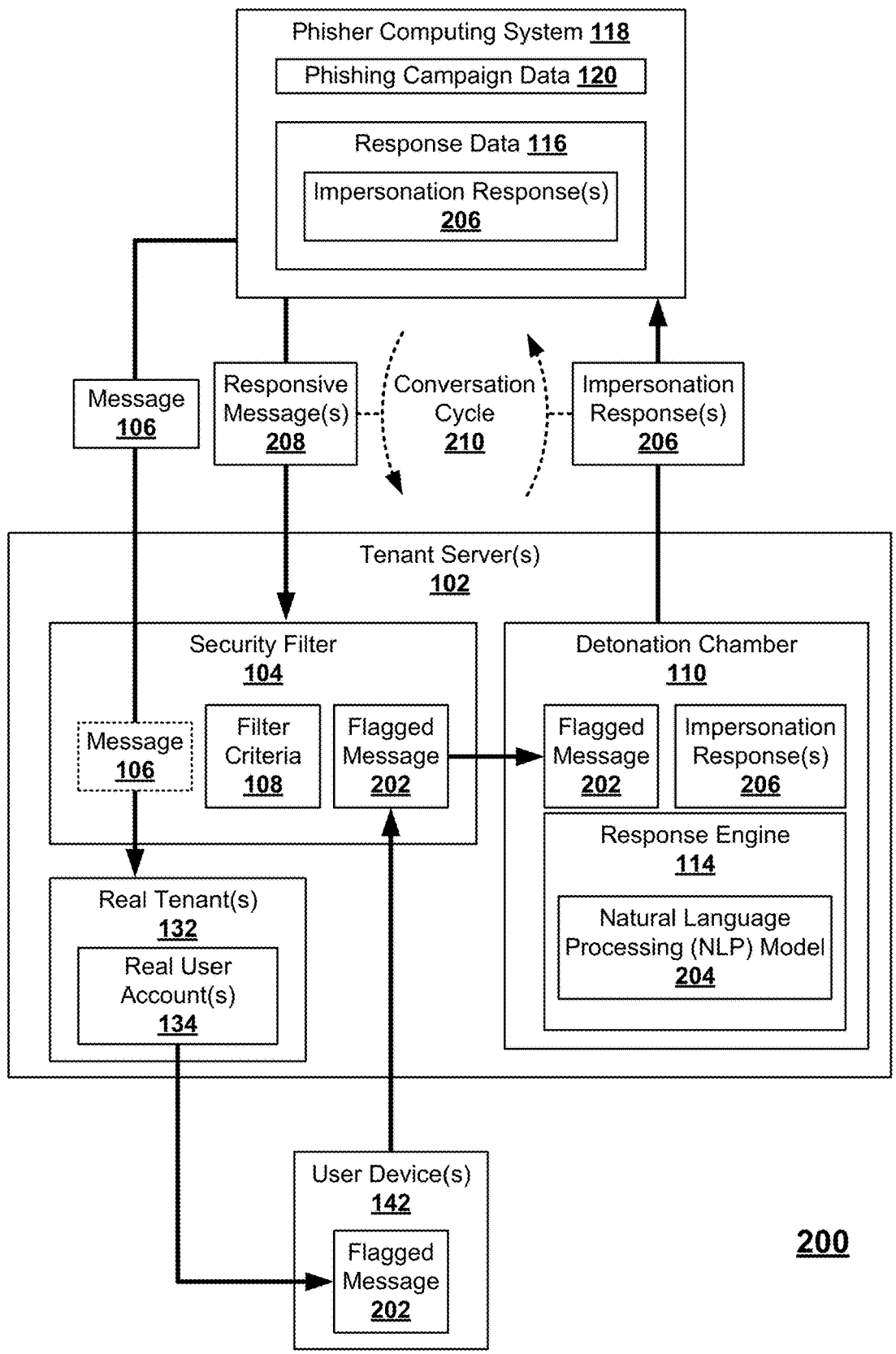
FIG. 2 illustrates a system for enabling a real user to designate a message as a phishing attempt to deploy artificial intelligence (AI) techniques to generate an impersonation response lures a phisher into a conversation cycle.

Turning now to FIG. 2, illustrated is a system 200 for enabling a real user to designate a message 106 as a phishing attempt in order to deploy artificial intelligence (AI) techniques to generate an impersonation response 206 which lures a phisher associated with the message 106 into a conversation cycle 210. As illustrated, the message 106 originates at the phisher computing system 118 in association with a phishing campaign—as described above in relation to FIG. 1. However, for purposes of the FIG. 2, the filter criteria 108 do not cause the security filter 104 to identify the message 106 as being a phishing message. For example, the message 106 may originate in association with a "novel" phishing campaign 126 that has not previously been identified and used to update the filter criteria 108. As illustrated in FIG. 2, the security filter 104 allows the message 106 to pass through to the real tenant 132 and into one or more real user accounts 134. For example, the message 106 may pass to an email inbox of a real user account 134 and, therefore, may be accessible by a real user via the user device 142.

Upon review of the message 106, the real user may recognize the nature of the message 106 and designate the message as a phishing attempt. That is, the real user may mark the message 106 as a flagged message 202 that is flagged ("designated") as a phishing email. The flagged message 202 may be transmitted to the security filter 104 which may analyze the flagged message 202 to update the filter criteria 108. As a specific but nonlimiting example, the security filter 104 may identify one or more user interface (UI) input controls of the flagged message 202 and update the filter criteria 108 for identifying similar or identical UI input controls in future messages 106 that are received via the tenant server(s) 102. Exemplary such UI input controls include, but are not limited to, links to websites, form fields, particular phrases and/or patterns of phrases, and so on. As illustrated, the flagged message 202 may also be passed into the detonation chamber 110 to facilitate securely interacting with and/or responding to the flagged message 202 using the response engine 114. For example, one or more links that are included within the flagged message 202 may be activated within the detonation chamber 110 to safely observe the resulting effects.

The flagged message 202 may be analyzed by the response engine 114 to generate a response to the flagged message 202. In the illustrated embodiment, the response that is generated by the response engine 114 is an impersonation response 206 that is transmitted to the phisher computing system 118 with data indicating that the impersonation response originated (e.g., was drafted in and/or transmitted from) from the particular real user account 134 to which the message 106 was addressed. For example, if the message 106 is specifically addressed to steve@enterprisedomain.com, then the impersonation response 206 may include data that is designed to forge a portion of header data included within the impersonation response 206 so that the appears to have originated from the real user account 134 of steve@enterprisedomain.com—despite having actually originated from within the detonation chamber 110. Stated plainly, an impersonation response 206 is a response that is designed to "spoof" the particular user account to which the message 106 was addressed.

In various implementations, the response engine 114 may analyze the flagged message 202 to identify one or more types of sensitive information that are being pursued. As a specific but nonlimiting example, the flagged message 202 may be an email message that appears to originate from the user's cellular phone service provider. The flagged message 202 may indicate that the user's account is past due, and that service will be terminated unless a payment is submitted immediately. The flagged message 202 may further indicate that payment can be submitted via a cashier's check or a credit card by replying the email with that information. Under these specific circumstances, the response engine 114 may analyze the flagged message 202 to determine that the phishing campaign is pursuing credit card information. Then, the response engine 114 may generate (or otherwise obtain) false credit card information to include within the impersonation response 206.

In various implementations, the response engine 114 may leverage one or more artificial intelligence (AI) techniques to generate a response to the flagged message 202 that closely resembles how a human might actually respond to such a message. In the illustrated embodiment, the response engine 114 includes a natural language processing (NLP) model 204 that is usable to generate responses to messages in a manner that is consistent with how two humans might typically interact and/or converse with one another. For example, the response engine 114 may generate a response to the flagged message 202 that is apologetic for becoming past due on the cellular phone account and asking whether the company will accept a particular type of credit card. Then, the response that is generated may be transmitted to the phisher computer system 118 as the impersonation response 206. In this example, the response engine 114 has generated an impersonation response 206 that indicates a willingness to comply with the phishing message scam, but which does not actually include the sensitive information that is being pursued.

In various implementations, the response engine 114 may be specifically designed to generate such responses when feasible in order to lure the phisher into replying to the impersonation response 208 with a responsive message 208. In this way, the response engine 114 may be initiate a conversation cycle 210 with the phisher in which a series of additional impersonation responses 206 and responsive messages 208 are transmitted between the phisher and the response engine 114—thereby consuming the phisher's time and resources.

In some implementations, the impersonation responses 206 may be tagged with data that instructs or otherwise causes the tenant servers 102 to prevent the responsive messages 208 from being sent to the real user account 134. In this way, once the impersonation response 206 is sent by the response engine 114, any resulting messages from the phisher that are addressed to the user will not end up in the user's real email inbox. Thus, once a user flags the message 106 as being a phishing attempt, the system 200 will initiate the conversation cycle 210 to waste the phisher's time without consuming any additional amount of the real user's time.

In some implementations, the response engine 114 may be designed to induce a conversation cycle 210 in which the phisher is lured into divulging additional details of one or more other phishing campaigns 126. As a specific but nonlimiting example, the response engine 114 may generate an impersonation response 206 that provides information for a false credit card that has a recently lapsed expiration date. The false credit card information may be designed to cause actual credit card charging systems to indicate that the card has expired. Thus, if the phisher attempts to use the false credit card information to make an online purchase (as phishers often do anonymously online with real credit card information), they will receive a message that payment cannot be processed because the credit card provided has expired. This may induce the phisher into sending a responsive message 208 that indicates that payment has failed and that requests alternate credit card information. Then, the response engine 114 may generate another impersonation response 206 that indicates that the credit card provided was the only credit card owned and that the user was unaware that it had expired.

The message generated by the response engine 114 may further inquire as to whether any alternate forms of online payment can be accepted. This impersonation response 206 may then induce the phisher into providing instructions on how to remit payment to a particular online payment account that the phisher also uses to conduct another phishing campaign 126.

In some embodiments, the additional details of the phishing campaigns 126 that are identified by inducing the conversation cycle 210 may be used to update the filter criteria 108. For example, when the phisher is induced into providing details associated with the particular online payment account, the filter criteria 108 may be updated to reflect this information. Once the filter criteria 108 are updated, then any emails received at the tenant server 102 in the future which contain details regarding this particular online payment account may be recognized by the security filter 104 as being associated with a phishing campaign 126.

Although these techniques are predominantly discussed in the context of the impersonation response 206 spoofing a real user account 134, it is contemplated that such techniques may also be deployed to spoof false user accounts 138 (not shown in FIG. 2) to which a message 106 is addressed. For example, as described above, a phishing entity may send out emails in association with a phishing campaign and may receive back a seed response 112(S) that includes false sensitive information. This false sensitive information may include false email aliases (e.g., email addresses). Then, the phishing entity may send out phishing emails to this false email address. Upon receipt of phishing emails that are addressed to the false email address, the response engine 114 may generate an impersonation response 206 that spoofs the false email address.

Although these techniques are predominantly discussed in the context of the impersonation response(s) 206 and/or conversation cycle 210 occurring as a result of the message 106 being manually flagged by the user of the real user account 134 as phishing, it is contemplated that such techniques may also occur as a result of the message 106 being flagged as phishing by the security filter 104 based on the filter criteria. For example, the impersonation response(s) 206 and/or conversation cycle 210 described in relation to FIG. 2 may occur even with respect to messages that do not pass through the security filter 104 to the real user account 134.

Figure 3:
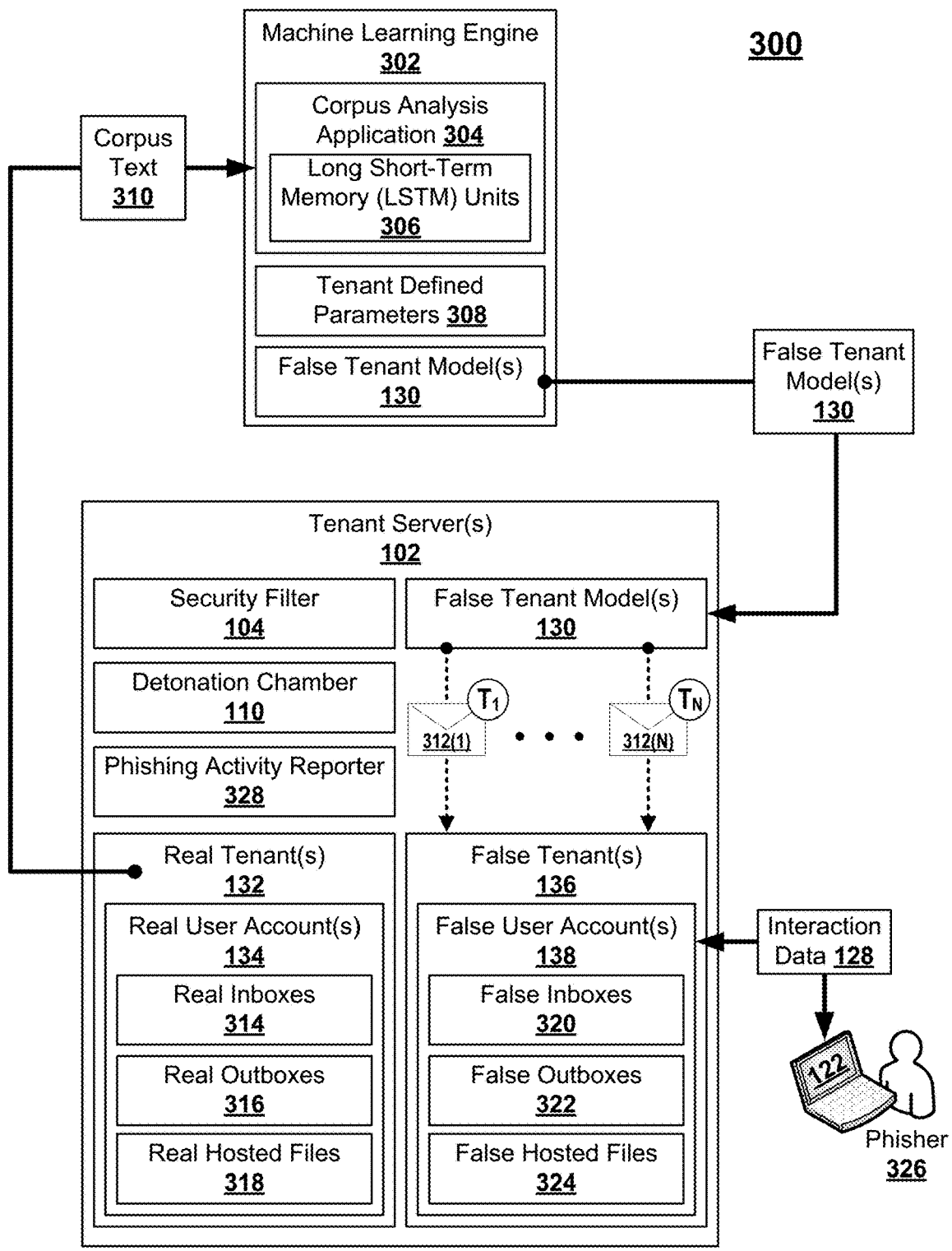
FIG. 3 is a schematic diagram of an illustrative computing environment that is configured to deploy a machine learning engine to analyze a corpus of text to generate false tenant model that is usable to populate a false tenant with messages and/or data files.

Turning now to FIG. 3, a schematic diagram shows an illustrative computing environment 300 that is configured to deploy a machine learning engine 302 to analyze a corpus of text 310 to generate a false tenant model 130 for populating a false tenant 136 with messages 312. In the illustrated implementations, the false tenant model 130 is used to periodically generate new messages 312 and add these newly generated messages 312 to the false tenant account 136. In this way, when a phisher 326 logs into the false user account 138 (e.g., using credential obtained in a seed response 112(S)) it will appear as if the false user account 136 is actually being used at that time. For example, from the perspective of the phisher 326, new messages 312 will be periodically received in a false inbox 320 and other messages 312 will appear in a false outbox 322 making it appear as if a real user is actually signed into and conducting business from the false user account 138.

In some embodiments, the false tenant model 130 may be created by receiving a corpus of text 310 from one or more real tenants 132. The corpus of text 310 may be a selected portion of data that is saved in association with one or more real user accounts 134. As illustrated, the real user accounts 134 may include one or more of real inboxes 314, real outboxes 316, and/or real hosted files 318. The real inboxes 314 may correspond to storage locations in which incoming emails that are addressed to particular email aliases are stored. The real outboxes 316 may correspond to storage locations in which copies of outgoing mail that is sent from the particular email aliases are stored. The real hosted files 318 may correspond to storage locations in which users of the real user accounts 134 are enabled to store data files such as, for example, text documents, spreadsheets, slide presentations, and so on. It can be appreciated that individual real user accounts 134 may each have an individual corresponding real inbox 314, real outbox 316, and set of real hosted files 318.

In some embodiments, the corpus of text 310 may include one or more real inboxes 314, real outboxes 316, and sets of real hosted files 318. For example, an administrator of a particular real tenant 132 may select a particular set of real user accounts 134 that are to be used as the corpus of text 310. In some embodiments, one or more false tenants 136 may individually correspond to one or more real tenants 132. In this way, the messages 312 and/or data files that are ultimately generated to populate the false user accounts 138 of a particular false tenant 136 may actually stem from a corpus of text 310 that is obtained from real user accounts 134 of the particular real tenant 132 to which the false tenant 136 corresponds. For example, a particular enterprise that subscribes to a real tenant 132 may provide access to one or more of its real user accounts 134 to be used as the corpus of text 310. It can be appreciated that in such embodiments the actual messages 312 and/or data files that are generated by the false tenant model 130 that is generated based on the corpus of text 310 provided by a particular real tenant 132 may appear to the phisher 326 as genuine business data.

As illustrated, the corpus of text 310 may be provided to the machine learning engine 302 and, more particularly, to a corpus analysis application 304 that is implemented by the machine learning engine 302. When deployed by the machine learning engine 302 to analyze the corpus of text 310, the corpus analysis application 304 may utilize a recurrent neural network (RNN) to determine various properties of the corpus of text 310. As a specific example, the corpus analysis application 304 may utilize an RNN that includes a plurality of layers of Long Short-Term Memory (LSTM) units 306 to analyze the corpus of text and determine the various properties. With regard to the properties of the corpus of text 310, the corpus analysis application 304 may determine the vocabulary that is used within the corpus of text 310. The corpus analysis application 304 may further determine the frequency with which various words within the vocabulary are used and/or the context within which the various words within the vocabulary are used.

Based on the properties that are determined for the corpus of text 310, the corpus analysis application 304 may generate a false tenant model 130 that is usable to generate messages 312 and/or data files that are structurally similar to those included within the corpus of text 310—but which are fanciful and of no actual value to the phisher 326. In some embodiments, these generated messages 312 and/or data files are generated and then added to the false user accounts 138 periodically over time. For example, as illustrated, a first message 312(1) is transmitted to the false user accounts 138 at a first time $T_1$ whereas a second message 312(N) is transmitted to the false user account 138 at an Nth time $T_N$—that is subsequent to the first time $T_1$. In this way, the false user accounts 138 are continually changing over time—just as a real user account 132 that is actually being used does.

In some embodiments, the false tenant model 130 is designed to populate the false tenant accounts 138 with new messages 312 in accordance with patterns of activity that are identified within the corpus of text 310. For example, the false tenant model 130 may cause "generated" messages 312 to be sent to the false inboxes 130 at a rate that is similar to that which "real" messages are sent to the real inboxes 314 over the course of a typical business day. Furthermore, such activity may be slowed or halted during off-peak, non-business, and/or holiday hours. Similar, patterns of activity may be identified with respect to the real outboxes 316 and/or real hosted files 318 and may be incorporated into the false tenant model 130. In this way, the frequency at which "sent" messages 312 are populated into the false outbox 322 may resemble that which the real user(s) actually send messages. Additionally, or alternatively, the frequency at which data files are added to the set of real hosted files 318 may also be similarly modulated.

In some embodiments, the system 300 may implement a phishing activity reporter 328 that is configured to report certain types of phishing activity to the real tenants 132. For example, the phishing activity reporter 328 may monitor interaction data 128 that takes place between a phisher device 122 and the false user accounts 138 to determine whether the phisher 326 appears to be a common "commodity" type phisher that is pursuing sensitive information but has no particular or heightened interest in obtaining sensitive data specifically from a particular tenant. For example, the interaction data 128 may correspond to the phisher 326 logging onto a false user account 138 that appears to the phisher 326 to be owned by steve@enterprisedomain.com. Once logged on, the phisher 326 may download false contact information that is associated with the false user account 138 without browsing through and/or reading various specific documents that are stored in this account. Under these circumstances, the phishing activity reporter 328 may classify the phisher as a common "commodity" type phisher and report the phishing activity to one or more real tenants 132.

Alternatively, once logged on, the phisher 326 may begin speedily browsing through and/or downloading the various false documents (e.g., fake email messages, fake data files, fake engineering drawings, etc.). It can be appreciated that this type of phishing activity may indicate that the phisher 326 has a specific interest in obtaining sensitive details about the particularly targeted business. Under these alternative circumstances, the phishing activity reporter 328 may classify the phisher as an "industrial espionage" type phisher and report the phishing activity to a specifically targeted real tenant 132. In this way, a real business can deploy false user accounts 138 that appear to include information that is valuable to their competitors and, therefore, serve to attract malicious competitors into accessing these accounts. Then, when the real business is actually targeted by such a competitor they can quickly learn of the ongoing threat and take appropriate security measures. It can be appreciated that such accounts may colloquially be referred to as "honeypot" accounts or simply "honeypots".

In some instances, the system 300 enables personnel associated with the individual real tenants 132 to provide tenant defined parameters 308 that prescribe various aspects of how the messages 312 and/or other content is to be generated for the false user accounts 138. In some implementations, the tenant defined parameters 308 may prescribe that specific words and/or phrases be included and/or omitted from any documents that are generated by the false tenant model 130. As a specific but nonlimiting example, a tenant administrator associated with the real tenant 132 may recognize that due to a major product release being internally code names as "RENO," this word will appear with frequency in the corpus of text 310. Normally, this may trigger the false tenant model 130 to generate documents that also include this word. However, in order to further shield their internal operations and protect this code name from being externally identified by a phisher 326, the tenant defined parameters 308 may restrict this word from being used in any documents that are added to the false user account(s) 138 that are based on that particular real tenant 132.

Additionally, or alternatively, the tenant defined parameters 308 may include file names for specific messages 312 and/or data files that are generated by the false tenant model 130. For example, suppose that a business is in the process of developing a new version of a product. A tenant administrator may rename fake email messages and/or hosted documents to include a name of this product. In this way, if a phisher gains access to the false user account 138 and begins reading and/or downloading files that are names to indicate their relation to the product, the phishing activity reporter 328 may report this activity to inform the tenant administrator that potential industrial espionage is taking place.

Figure 4:
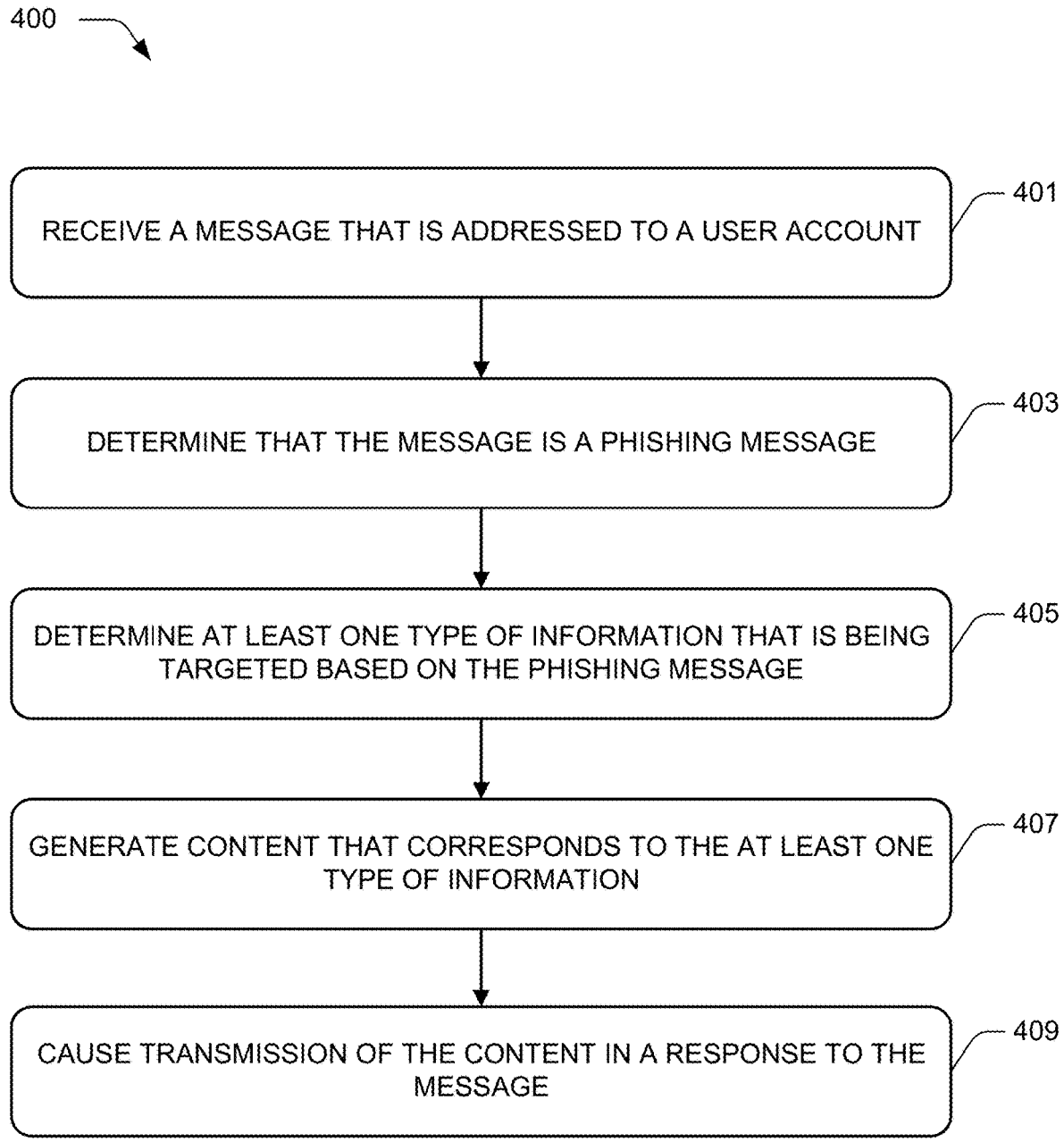
FIG. 4 is a flow diagram of an exemplary process to pollute phishing campaign responses by generating and transmitting content that is responsive to phishing messages.
Figure 5:
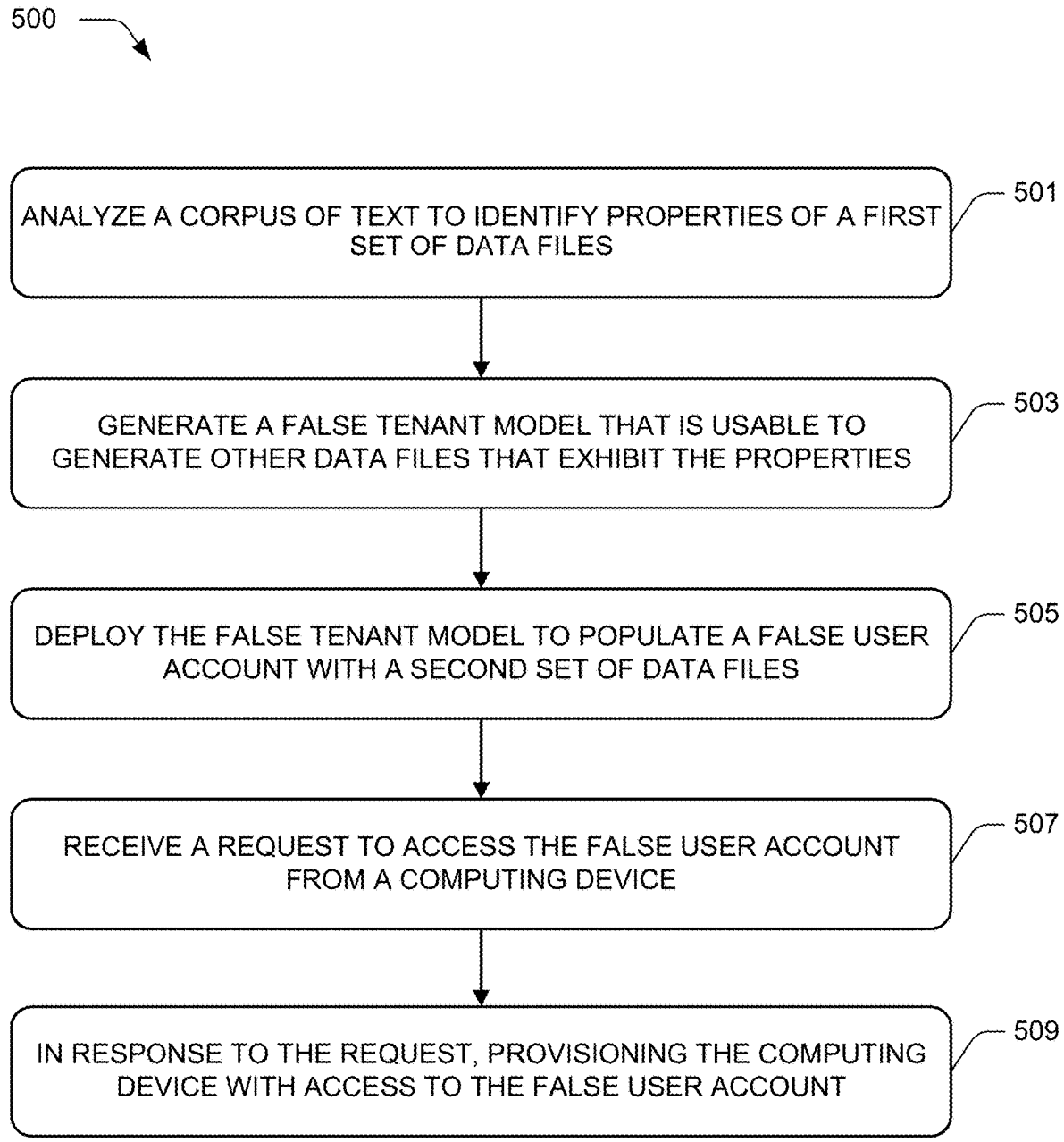
FIG. 5 is a flow diagram of an exemplary process to provision access to a false user account that is populated with fake data files that are generated based on a false tenant model.

FIGS. 4 and 5 are flow diagrams of illustrative processes 400 and 500 which are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

Turning now to FIG. 4, illustrated is a flow diagram of an exemplary process 400 to pollute phishing campaign responses by generating and transmitting content that is responsive to phishing messages.

At block 401, a system may receive a message 106 that is addressed to a user account. For example, the message 106 may be an email message that is addressed to a real user account 134. Additionally, or alternatively, the message 106 may be an email message that is addressed to a false user account 138. Although described predominantly in the context of the message 106 being an email message, it is contemplated and within the scope of the present disclosure that the message 106 take a variety of forms such as, for example, an instant messaging type message, a Short Message Service (SMS) message, and so on.

At block 403, the system may determine that the message 106 is a phishing message. For example, the system may utilize a security filter 104 to analyze the message 106 with respect to some filter criteria 108. Additionally, or alternatively, the message 106 may be flagged as being a phishing message by an end user associated with the user account to which the message is addressed.

At block 405, the system may determine at least one type of "sensitive" information that the message 106 is designed to fraudulently obtain. For example, the system may determine that the message 106 includes a link to a phishing webpage and that this phishing webpage requests credit card information from visiting users. In some embodiments, the system may open such a linked phishing webpage within an isolated computing environment (e.g., a container, a sandbox, etc.). Then, the system may analyze the phishing webpage to determine what type(s) of information is being sought in the phishing webpage. Additionally, or alternatively, the system may analyze a body of text of the message 106 using a natural language processing (NLP) model to determine the type(s) of information that is being sought.

At block 407, the system may generate content that corresponds to the type(s) of information that is being sought. For example, if the message 106 is designed to fraudulently obtain credit card information (e.g., credit card numbers, expiration dates, etc.), then the system may generate this type of information using a credit card number generator. As another example, if the message 106 is designed to fraudulently obtain user names and/or passwords for real user accounts 134, then the system may generate fake user names and/or fake passwords.

At block 409, the system may cause the content generated at block 407 to be transmitted in a response to the message 106. For example, under circumstances where the message 106 includes a link to the phishing webpage that includes form fields for submitting requested information, the system may enter the generated content into the form fields. Then, once the form field(s) have the content entered therein, the system may activate a UI input control that submits a response (that includes the entered content) to a phisher computing system. It can be appreciated that because the content that is submitted in response to the message 106 is not real sensitive content, the techniques described herein are usable to pollute response data 116 that is received in association with phishing campaigns 126. For example, if any real responses 112(R) are received in association with the phishing campaign 126, these real responses 112(R) will be buried or hidden within a plurality of false responses 112(F) that contain totally useless information and/or seed responses 112(S) that contain information that provides access to false user accounts 138. Thus, the technologies described herein provide a significant barrier to successfully exploiting any fraudulently obtained "real" sensitive information.

Turning now to FIG. 5, illustrated is a flow diagram of an exemplary process 500 to provision access to a false user account that is populated with fake data files that are generated based on a false tenant model.

At block 501, a system may analyze a corpus of text 310 to identify properties of a first set of data files. For example, the system may receive the corpus of text 310 in the form of selections of one or more components of real users accounts 134 such as, for example, real inboxes 314, real outboxes 316, and/or real hosted file locations. The corpus of text 310 may be provided to a corpus analysis application 304 which may utilize various artificial intelligence (AI) techniques to discern the properties of the first set of data files. As a specific example, the corpus analysis application 304 may utilize an RNN that includes a plurality of layers of Long Short-Term Memory (LSTM) units 306 to analyze the corpus of text and determine the various properties. With regard to the properties of the corpus of text 310, the corpus analysis application 304 may determine the vocabulary that is used within the corpus of text 310. The corpus analysis application 304 may further determine the frequency with which various words within the vocabulary are used and/or the context within which the various words within the vocabulary are used.

At block 503, the system may generate a false tenant model 130 that is usable to generate other data files that also exhibit the properties of the first set of data files. For example, if the corpus of text 310 includes a plurality of emails included in one or more real inboxes 314 and/or real outboxes 316, then the false tenant model 130 may be usable to generate other individual emails that exhibit similar properties as was observed in association with the corpus of text 310. However, despite appearing similar to the first set of data files, the files that are generated by the false tenant model 130 are fanciful data files with no real value to a phisher who gains access thereto. For example, the generated files may appear to be genuine email documents despite being generated by a computing system rather than by an actual person.

At block 505, the system may deploy the false tenant model 130 to populate a false user account 138 with a second set of data files. For example, the false user account 138 may be an email account that appears to be a real email account and may even be usable to send and/or receive emails. However, the false user account 138 is not actually assigned to a real user but rather is a "honeypot" type user account that is designed to attract phishers to observe their computing habits, waste their time, and/or extract additional detail regarding new and/or evolving phishing campaigns.

At block 507, the system may receive a request for access to the false user account 138 from a computing device such as, for example, the phisher device 122. The phisher device 122 may be a laptop computer or some other type of personal computing device. The request may include credentials associated with the false user account 138. For example, the credentials may be transmitted in a seed response 112(S) to lure the phisher(s) into accessing the honeypot type false user account 138.

Then, at block 509, the system may respond to the request by provisioning the computing device with access to the second set of data files. In this way, the phisher is enabled to log into the false user account 138 which in turn provides the phisher with the false impression that access has been obtained to a real user account 134 that is being used to conduct actual business. Furthermore, in some embodiments, the false tenant model 130 may be used to periodically generate and add new files into the false user account 138. In this way, the phisher can be logged into the false user account 138 and, in real time, be witnesses emails being sent and/or received to give the impression that a real user is concurrently logged into and even using the false user account 138.

Figure 6:
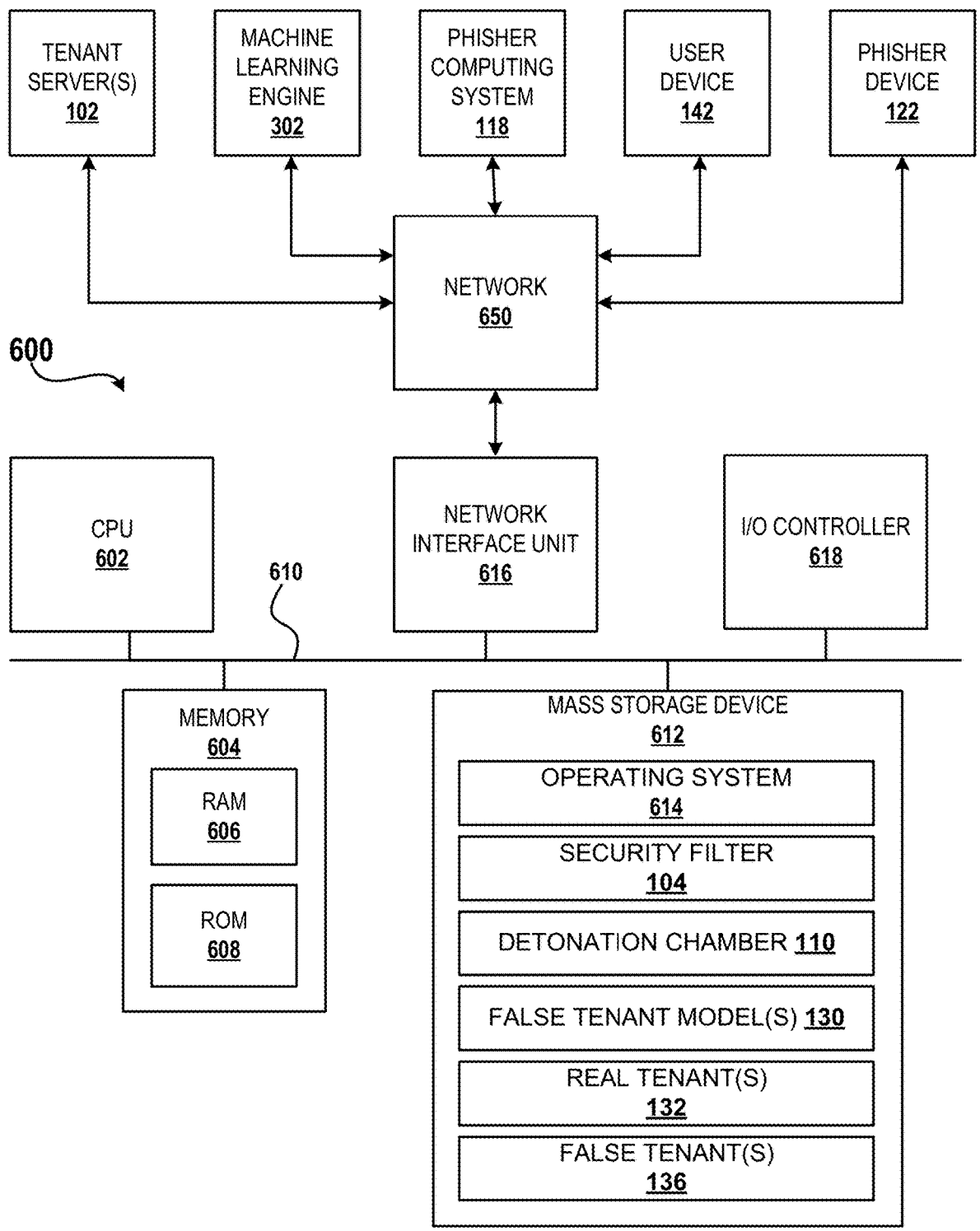
FIG. 6 shows additional details of an example computer architecture for a computer capable of executing the techniques described herein.

FIG. 6 shows additional details of an example computer architecture 600 for a computer capable of executing the techniques described herein. The computer architecture 600 illustrated in FIG. 6 illustrates an architecture for a server computer, or network of server computers, or any other types of computing devices suitable for implementing the functionality described herein. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between input controls within the computer architecture 600, such as during startup, is stored in the ROM 608. The computer architecture 600 further includes a mass storage device 612 for storing an operating system 614, other data, and one or more application programs. The mass storage device 612 may further include one or more of the security filter 104, the detonation chamber 112, the false tenant model 130, the real tenants 132), and/or the false tenants 136.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various techniques, the computer architecture 600 may operate in a networked environment using logical connections to remote computers through a network 650 and/or another network (not shown). The computer architecture 600 may connect to the network 650 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that via a connection to the network 650 through a network interface unit 616, the computing architecture may enable the tenant servers 102 to communicate with one or more of the machine learning engine 302, the phisher computing system 118, the user device 142, and/or the phisher device 122.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit input controls, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware input controls constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit input controls constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

EXAMPLE CLAUSES

The disclosure presented herein may be considered in view of the following clauses.

Example Clause A, a computer-implemented method for polluting response data that corresponds to a phishing campaign, the method comprising: receiving a message that is addressed to a user account, wherein the message includes data that causes generation of at least one user interface (UI) input control which, when activated, is designed to cause generation of at least some of the response data that corresponds to the phishing campaign; analyzing the message with respect to filter criteria to determine whether to designate the message as being a phishing message; and based on the message being designated as the phishing message: preventing the message from being transmitted to a user device that corresponds to the user account; activating the at least one UI input control to generate content that is responsive to the message; and causing a response that includes the content to be transmitted to a phisher computing system to pollute the response data that corresponds to the phishing campaign.

Example Clause B, the computer-implemented method of Example Clause A, wherein the response is a seed response that includes at least one false user credential that corresponds to a false user account.

Example Clause C, the computer-implemented method of Example Clause B, further comprising deploying a false tenant model to populate the false user account with a plurality of messages.

Example Clause D, the computer-implemented method of Example Clause B, further comprising: monitoring computing activity that occurs in association with the false user account to determine configuration data associated with at least one of a phisher device or the phisher computing system; determining, based on the configuration data, that an attempt to login to a real user account originated from the phisher device; and based on the attempt originating from the phisher device, initiating a predefined security protocol in association with the real user account.

Example Clause E, the computer-implemented method of Example Clause A, wherein the activating the at least one UI input control to generate the content occurs within an isolated computing environment to at least partially isolate one or more real user accounts from the message.

Example Clause F, the computer-implemented method of Example Clause A, wherein activating the at least one UI input control includes populating one or more form fields with the content that is responsive to the message.

Example Clause G, the computer-implemented method of Example Clause A, wherein the response is an impersonation response that includes data indicating that the response originated from the user account to which the message is addressed.

Example Clause H, the computer-implemented method of Example Clause A, wherein the content that is transmitted to the phisher computing system includes false financial account information.

Example Clause I, a system, comprising: at least one processor; and at least one memory in communication with the at least one processor, the at least one memory having computer-readable instructions stored thereupon that, when executed by the at least one processor, cause the at least one processor to: determine that a message that is addressed to a user account corresponds to a phishing campaign; based on the message corresponding to the phishing campaign, transmit the message into an isolated computing environment to at least partially isolate the user account from the message; deploy a response engine in association with the isolated computing environment to: analyze the message to identify at least one type of information that is being requested in association with the phishing campaign, and generate content that corresponds to the at least one type of information; and cause a response that includes the content to be transmitted to a phisher computing system to pollute response data that corresponds to the phishing campaign.

Example Clause J, the system of Example Clause I, wherein the response engine is configured to analyze the message based on a natural language processing model to identify the at least one type of information that is being requested in association with the phishing campaign.

Example Clause K, the system of Example Clause I, wherein the computer-readable instructions further cause the at least one processor to facilitate a conversation cycle in association with the phishing campaign by: identifying one or more responsive messages that stem from the response; and deploying the response engine to generate one or more additional responses that correspond to the one or more responsive messages.

Example Clause L, the system of Example Clause I, wherein the response is a seed response that includes at least one false user credential that corresponds to a false user account.

Example Clause M, the system of Example Clause L, wherein the computer-readable instructions further cause the at least one processor to monitor computing activity that occurs in association with the false user account to determine configuration data associated with a phisher device.

Example Clause N, the system of Example Clause I, wherein the computer-readable instructions further cause the at least one processor to: activate at least one UI input control that is included within the message to open a webpage; and populate one or more form fields on the webpage with the content that is responsive to the message.

Example Clause O, the system of Example Clause I, wherein activating the at least one UI input control includes repeatedly activating the at least one UI input control to conduct at least one or a Denial of Service attack or a Distributed Denial of Service attack.

Example Clause P, a computer-implemented method, comprising: analyzing a corpus of text to identify properties of a first plurality of data files; generating a false tenant model that is usable to generate individual data files that exhibit the properties; deploying the false tenant model to populate a false user account with a second plurality of data files that exhibit the properties; receiving, from a computing device, an access request that corresponds to the false user account, wherein the access request includes user credentials that correspond to the false user account; and responsive to the access request including the user credentials, provisioning the computing device with access to the false user account that is populated with the second plurality of data files.

Example Clause Q, the computer-implemented method of Example Clause P, wherein at least some individual data files of the second plurality of data files are populated into the false user account concurrently with the provisioning the computing device with access to the false user account.

Example Clause R, the computer-implemented method of Example Clause P, further comprising: receiving a message that is addressed to a real user account; and causing a seed response that includes the user credentials to be transmitted to a phisher computing system in response to the message.

Example Clause S, the computer-implemented method of Example Clause P, wherein the corpus of text corresponds to at least a portion of one or more real user accounts.

Example Clause T, the computer-implemented method of Example Clause P, wherein the second plurality of data files are generated based on the false tenant model and one or more tenant defined parameters.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for polluting response data that corresponds to a phishing campaign, the method comprising:
receiving a message that is addressed to a real user account and includes data that causes generation of a phishing user interface (UI) which is configured to request a transmission of the response data that corresponds to the phishing campaign;
preventing, based on the message satisfying filter criteria associated with being a phishing message, the message from being transmitted to a user device that corresponds to the real user account;
analyzing at least one real data file stored in association with the real user account;
identifying, based at least in part on the analyzing, one or more properties of the at least one real data file;
generating a false user account and at least one false data file that exhibits the one or more properties of the at least one real data file;
storing the at least one false data file in association with the false user account;
transmitting, to a phisher computing system in response to the message, a response that includes false user credentials associated with the false user account;
receiving, from a computing device, an access request that includes the false user credentials; and
responsive to the access request including the false user credentials, provisioning the computing device with access to the at least one false data file that is stored in association with the false user account.

2. The computer-implemented method of claim 1, further comprising:
monitoring computing activity that occurs in association with the false user account to determine configuration data associated with at least one of a phisher device or the phisher computing system;
determining, based on the configuration data, that an attempt to log into the real user account originated from the phisher device; and
based on the attempt originating from the phisher device, initiating a predefined security protocol in association with the real user account.

3. The computer-implemented method of claim 1, wherein the transmitting the response includes activating at least one UI input control that corresponds to the message within an isolated computing environment to at least partially isolate the real user account from the message.

4. The computer-implemented method of claim 1, wherein the transmitting the response includes populating one or more form fields, of the message, with the false user credentials.

5. The computer-implemented method of claim 1, wherein the response is an impersonation response that includes data indicating that the response originated from the real user account to which the message is addressed.

6. The computer-implemented method of claim 1, wherein the at least one false data file is generated based on one or more predefined parameters associated with the real user account, the one or more predefined parameters configured to identify sensitive content, in the at least one real data file, that is to be omitted when generating the at least one false data file.

7. A system, comprising:
at least one processor; and
at least one memory in communication with the at least one processor, the at least one memory having computer-readable instructions stored thereupon that, when executed by the at least one processor, cause the at least one processor to:
determine that a message that is addressed to a real user account corresponds to a phishing campaign;

based on the message corresponding to the phishing campaign, transmit the message into an isolated computing environment to at least partially isolate the real user account from the message;

deploy, in association with the isolated computing environment, a response engine that is configured to:
- analyze the message to identify at least one type of information that is being requested in association with the phishing campaign,
- identify, based at least in part on the analyzing, one or more properties of a real data file associated with the at least one type of information,
- generate a false user account and at least one false data file that exhibits the one or more properties of the real data file associated with the at least one type of information,
- store the at least one false data file in association with the false user account, and
- determine a false user credential for the false user account;

cause a response that includes the false user credential to be transmitted to a phisher computing system to pollute response data that corresponds to the phishing campaign;

receive, from a computing device, an access request that includes the false user credential; and responsive to the access request including the false user credential, provision the computing device with access to the at least one false data file that is stored in association with the false user account.

8. The system of claim 7, wherein the response engine is configured to analyze the message based on a natural language processing model to identify the at least one type of information that is being requested in association with the phishing campaign.

9. The system of claim 7, wherein the computer-readable instructions further cause the at least one processor to facilitate a conversation cycle in association with the phishing campaign by:
- identifying one or more responsive messages that stem from the response; and
- deploying the response engine to generate one or more additional responses that correspond to the one or more responsive messages.

10. The system of claim 7, wherein the computer-readable instructions further cause the at least one processor to monitor computing activity that occurs in association with the false user account to determine configuration data associated with the computing device from which the access request is received.

11. The system of claim 7, wherein the computer-readable instructions further cause the at least one processor to:
- activate at least one user interface (UI) input control that is included within the message to open a webpage; and
- populate one or more form fields on the webpage with content that is responsive to the message.

12. The system of claim 11, wherein activating the at least one UI input control includes repeatedly activating the at least one UI input control to conduct at least one of a Denial of Service attack or a Distributed Denial of Service attack.

13. The system of claim 7, wherein the at least one false data file is generated based on one or more predefined parameters associated with the real user account, the one or more predefined parameters configured to identify sensitive content, in the real data file, that is to be omitted when generating the at least one false data file.

14. A computer-implemented method, comprising:
- receiving a corpus of text that includes a first plurality of data files;
- analyzing the first plurality of data files;
- identifying, based at least in part on the analyzing, one or more properties exhibited by the first plurality of data files;
- generating, based on the corpus of text, a false tenant model that is configured to generate individual false data files that exhibit the one or more properties that are exhibited by the first plurality of data files;
- populating, based on the false tenant model, a false user account with a second plurality of data files that is comprised of the individual false data files that exhibit the one or more properties;
- receiving, from a computing device, an access request that includes false user credentials that correspond to the false user account; and
- responsive to the access request including the false user credentials, provisioning the computing device with access to the second plurality of data files this is populated into the false user account.

15. The computer-implemented method of claim 14, wherein at least some individual data files of the second plurality of data files are populated into the false user account concurrently with the provisioning the computing device with access to the false user account.

16. The computer-implemented method of claim 14, further comprising:
- receiving a message that is addressed to a real user account; and
- causing a seed response that includes the false user credentials to be transmitted to a phisher computing system in response to the message.

17. The computer-implemented method of claim 14, wherein the corpus of text corresponds to at least a portion of one or more real user accounts.

18. The computer-implemented method of claim 14, wherein the second plurality of data files are generated based on the false tenant model and one or more tenant defined parameters.

19. The computer-implemented method of claim 14, further comprising:
- determining, based on computing activity that occurs in association with the false user account, configuration data that corresponds to the computing device.

20. The computer-implemented method of claim 19, wherein the configuration data includes an internet protocol (IP) address associated with the computing device and at least one of:
- a browser configuration corresponding to a web-browser that is operating on the computing device, or a plug-in that is operating on the computing device.

* * * * *